E. F. NORTHRUP.
PYROMETER.
APPLICATION FILED OCT. 12, 1916.
1,234,203.
Patented July 24, 1917.
FIG. 1.
FIG. 2.
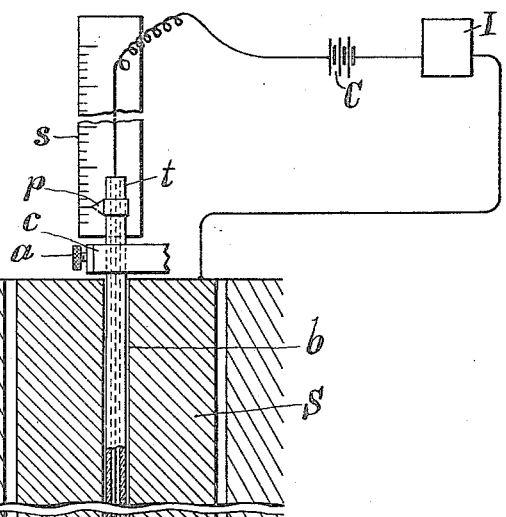
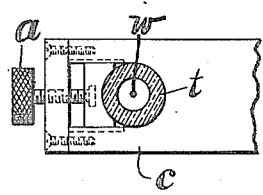
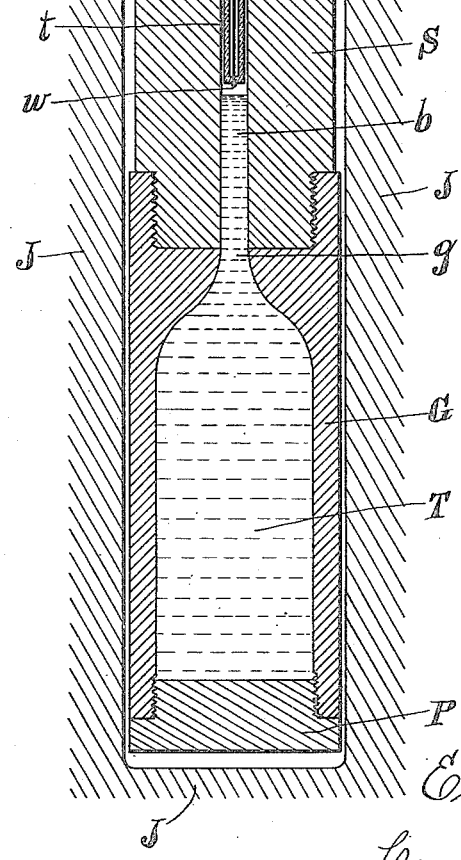
Inventor
Edwin F. Northrup
By Cornelius D. Ehret
Attorney

UNITED STATES PATENT OFFICE.

EDWIN F. NORTHRUP, OF PRINCETON, NEW JERSEY, ASSIGNOR TO PYROLECTRIC INSTRUMENT CO., OF TRENTON, NEW JERSEY, A CORPORATION OF NEW JERSEY.

PYROMETER.

1,234,203.  Specification of Letters Patent.  Patented July 24, 1917.

Application filed October 12, 1916. Serial No. 125,148.

*To all whom it may concern:*

Be it known that I, EDWIN F. NORTHRUP, a citizen of the United States, residing at Princeton, county of Mercer, State of New Jersey, have invented a new and useful Pyrometer, of which the following is a specification.

My invention relates to apparatus for measuring temperatures, particularly high temperatures, and resides in a pyrometer of novel structure.

In accordance with my invention, advantage is taken of the physical fact that tin, silver and some other metals, have or exhibit when in liquid or molten state a co-efficient of cubical or volume expansion which is constant or substantially constant, with the result that for a given temperature difference anywhere within the range between the melting and vaporization points of the metal the volume of the liquid or molten metal will change by a predetermined amount. This property makes it possible to use in the instrument a scale whose graduations are uniformly spaced throughout and whereby such scale is quickly and simply determined.

A further advantage of a pyrometer of the character herein described lies in the fact that its range may be large, particularly when the metal employed is tin, and in the further fact that is is robust, of relatively large dimensions as compared with an ordinary mercury thermometer, lending itself to direct insertion into the hot zone whose temperature is to be measured.

For an illustration of one of many forms my invention may take, reference is to be had to the accompanying drawing, in which:

Figure 1 is a vertical sectional view, some parts in elevation, taken through a pyrometer embodying my invention.

Fig. 2 is a top plan view on enlarged scale, partly in horizontal section, of a clamping device.

Referring to Fig. 1, G is a block of carbon, graphite or other suitable refractory material whose co-efficient of cubical expansion is small and negligible with respect to the co-efficient of cubical expansion of the metal T used therein. The chamber within the member G is closed at its lower end by a plug P of material similar to that of the member G screw threaded or otherwise suitably secured to the member G. The cavity within the block G has a restricted opening at $g$ with which registers the bore $b$ within the stem S of graphite or other suitable material similar to that of the block G, the stem S being screw threaded or otherwise suitably secured to the member G.

In the chamber in the member G is a mass of tin or other metal solid at ordinary temperatures and preferably having when in the liquid or molten state a co-efficient of cubical expansion which is substantially constant for all temperatures between its melting and vaporization points.

Tin is peculiarly suitable for the purpose of my invention because it melts at a relatively low temperature, namely 232 degrees C., and does not boil or vaporize until it has reached a temperature exceeding 2000 degrees C. Furthermore, it is cheap, is easily procured in a pure or substantially pure state, and remains so when in a reducing atmosphere and is readily prevented from oxidation when used in combination with graphite which in the relations shown produces when heated carbon monoxid which serves as a reducing gas to prevent oxidation of the tin.

The pyrometer of the character described may be inserted into the hot zone with the member G directly subjected to the temperature to be indicated or measured, or the pyrometer may be inclosed in a suitable jacket or tube J of suitable refractory material, such for example as comprises aluminum oxid, carbon silicid, or the like, and the whole then introduced into the hot zone; or the jacket J may be itself a part of or attached to the walls of the chamber the temperature of whose interior is to be measured or indicated.

When so subjected to the temperature to be measured the tin or other metal T first melts and thereafter its volume expands or increases in substantially direct proportion to the rise in temperature and the expanding molten metal rises within the bore $b$ of the stem S.

Within the bore $b$ is disposed a tube $t$ of refractory material, for example Marquardt porcelain, having sealed through its lower end a wire of tungsten, molybdenum or other refractory metal $w$ not soluble in the molten metal used, which extends upwardly through and out of the top of the tube $t$ and is connected in circuit with a source of current C, and indicating instrument I, such as a buzzer, electric lamp, etc., whose one terminal connects with the conducting stem S which is in electrical contact with the metal T.

The tube $t$ may be held in a suitable clamping device $c$, which, along with the scale $s$, may be mounted in fixed relation with respect to the stem S in any suitable manner.

Carried by the tube $t$ is a pointer or index $p$ coöperating with the scale $s$.

As the metal T expands, as above described, it rises within the bore $b$ of the stem S and contacts with the lower end of the wire $w$, thereby completing the circuit through the indicator I which then indicates that the metal column has risen. To read the temperature the thumb screw $a$ is loosened and the tube $t$ moved up or down until the wire $w$ just contacts with the metal in the stem; the temperature is read opposite the pointer $p$ for such position of the tube $t$. Or if the temperature is falling, the tube $t$ is lowered to such position that circuit is just established and again the reading is found opposite the pointer $p$.

Or if it be desired to learn when the temperature has changed to a predetermined point, the tube $t$ is clamped in such position that the index $p$ points to that temperature upon the scale. Then as the temperature reaches the predetermined value indicated by the pointer $p$ the circuit of the indicator I will be closed or opened, depending upon direction of the temperature change, and an audible or visual indication given or discontinued.

What I claim is:

1. Pyrometric apparatus comprising a vessel of refractory material, a hollow stem open to the atmosphere in communication therewith, a metal solid at ordinary temperatures contained in said vessel, said refractory material having a co-efficient of expansion negligible with respect to that of said metal, said metal when molten having a practically constant co-efficient of cubical expansion and expanding in said stem, and means for determining changes in volume of said metal when molten.

2. Pyrometric apparatus according to claim 1 and in which the refractory material is carbon.

3. Pyrometric apparatus according to claim 1 and in which the refractory material is graphite.

4. Pyrometric apparatus according to claims 1 to 3 inclusive and in which the stem is of carbon.

5. Pyrometric apparatus according to claims 1 to 3 inclusive and in which the stem is of graphite.

6. Pyrometric apparatus according to claims 1 to 5 inclusive and in which the metal is tin.

7. Pyrometric apparatus according to claims 1 to 6 inclusive and in which the means for determining changes in volume of the metal when molten comprises an index and a coöperating scale whose graduations for temperatures above the melting point of said metal are uniform.

In testimony whereof I have hereunto affixed my signature this 11 day of October, 1916.

EDWIN F. NORTHRUP.